United States Patent
Shin et al.

(10) Patent No.: US 7,017,163 B2
(45) Date of Patent: Mar. 21, 2006

(54) METHOD, SERVER, AND CLIENT USED IN CLIENT-SERVER DISTRIBUTED SYSTEM

(75) Inventors: Hidehiko Shin, Moriguchi (JP); Ken Yamashita, Yamatokoriyama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 87 days.

(21) Appl. No.: 10/910,322

(22) Filed: Aug. 4, 2004

(65) Prior Publication Data

US 2005/0033799 A1 Feb. 10, 2005

(30) Foreign Application Priority Data

Aug. 6, 2003 (JP) ............................. 2003-288093

(51) Int. Cl.
*G06F 13/00* (2006.01)

(52) U.S. Cl. ..................................... 719/330
(58) Field of Classification Search ................ 719/330; 379/201.03

See application file for complete search history.

(56) References Cited

U.S. PATENT DOCUMENTS 6,661,881 B1 * 12/2003 Garland et al. ........ 379/106.09

FOREIGN PATENT DOCUMENTS

JP 9-330287 12/1997

* cited by examiner

*Primary Examiner*—Sara Crane
(74) *Attorney, Agent, or Firm*—Wenderoth, Lind & Ponack, L.L.P.

(57) ABSTRACT

In synchronous communication in a client-server-distributed data system, the turnaround time from when a client calls a server function until the client receives a notification of completion of the server function is reduced. A server includes a pre-processing registration section for registering pre-processing; a post-processing registration section for registering post-processing; a server command section for requesting to register the pre-processing and the post-processing; and a server function correspondence section for establishing correspondence between the pre-processing and the post-processing with a server function identifier. When the server receives a request message from a client to call a server function, the server execute pre-processing and sends a completion message including the execution result of the pre-processing to the client. After sending the completion message, the server executes post-processing.

10 Claims, 14 Drawing Sheets

FIG. 2

| SERVER FUNCTION IDENTIFIER | CORRESPONDING PROCESSING |
|---|---|
| SERVER FUNCTION A | PRE-PROCESSING 1 |
| SERVER FUNCTION B | PRE-PROCESSING 2 |
| SERVER FUNCTION B | POST-PROCESSING 1 |
| SERVER FUNCTION C | PRE-PROCESSING 3 |
| SERVER FUNCTION A | POST-PROCESSING 2 |

F I G. 1 3 PRIOR ART

METHOD, SERVER, AND CLIENT USED IN CLIENT-SERVER DISTRIBUTED SYSTEM

BACKGROUND OF THE INVENTION

1. Field of the Invention

The present invention relates to a method, a server, and a client used in a client-server distributed system which uses synchronous communication. More particularly, the present invention relates to a method, a server, and a client with which the turnaround time from when the client makes a server function call to the server until the client receives a notification that the server function has been completed, can be reduced.

2. Description of the Background Art

In conventional synchronous communication in a client-server distributed system using information processing terminals such as computers, a client makes a server function call to a server. The server executes processing corresponding to the called server function. When the processing has been completed, the server sends a notification of completion to the client.

FIG. 13 is a sequence diagram showing the flow of processing between a server and a client in a conventional synchronous communication method such as that described above. In FIG. 13, the time the client is able to perform processing operations is indicated by hatching. When the client makes a server function call to the server, the client cannot perform any process until receiving a notification from the server that the server function has been completed. The time from when the client calls a server function until the client is notified that the server function has been completed is called the "turnaround time". In view of the problem that the client cannot perform any process during the turnaround time, there is proposed a technique for reducing turnaround time, i.e., a technique for reducing the client's wait time (see Japanese Laid-Open Patent Publication No. 9-330287, for example).

FIG. 14 is a sequence diagram showing the flow for a conventional synchronous communication method described in Japanese Laid-Open Patent Publication No. 9-330287. In FIG. 14, a client includes a client command section for executing a process on the client side and calling a server function; and a communication control section for communicating with a server. When the need to call a server function arises, the client command section requests the communication control section to call the server function. In response to the request, the communication control section immediately returns a completion notification to the client command section indicating that the server function call has been failed. At the same time, the communication control section sends a request message to the server through asynchronous communication to request for the execution of the server function. The server having received the request message executes processing corresponding to the requested server function. Upon completion of the server function processing, the server sends a completion message to the client. The communication control section of the client holds the content of the completion message having been sent from the server. When the communication control section receives a request from the client command section to call the server function again, the communication control section notifies the client command section of completion of the server function, based on the content of the completion message held thereby.

As described above, by employing the synchronous communication method described in Japanese Laid-Open Patent Publication No. 9-330287, the turnaround time for the client can be reduced.

In the above-described conventional synchronous communication method, the communication control section immediately returns a completion notification to the client command section that the execution of the server function has been failed, whereby the turn around time for the client can be reduced. However, since the actual server function call is not made at the time when a server function completion notification is returned to the client command section, the client command section needs to call the server function at least twice to confirm the processing result of the server function call.

In addition, since the timing at which the server function processing is completed is unknown, the client may possibly make the second server function call before receiving a completion message from the server, resulting in creation of an unnecessary process.

SUMMARY OF THE INVENTION

Therefore, an object of the present invention is to provide a synchronous communication method, a server, and a client for a client-server system, with which in the case where the server executes processing corresponding to a server function, the turnaround time from when the client calls a server function until the client receives a notification that the server function has been completed can be reduced without causing the client to call the server function multiple times.

The present invention has the following features to attain the object mentioned above. A first aspect of the present invention is directed to a method used in a client-server distributed system in which a client makes a desired server function call to a server and the server executes processing corresponding to the called server function, the method comprising the steps of: registering pre-processing which is a part of the processing corresponding to the server function and which is processing up to the point where the minimum information necessary for the client is obtained; registering post-processing which is a part of the processing corresponding to the server function and which is processing to be executed after the pre-processing; and establishing correspondence between the registered pre-processing and the registered post-processing with a server function identifier indicating the server function.

In the above-described method, processing corresponding to the server function can be divided into pre-processing and post-processing.

It is preferred that the method further comprises the steps of: sending by the client a request message to the server to call a desired server function, the request message including a server function identifier which indicates the desired server function; receiving by the server the request message from the client; executing by the server pre-processing corresponding to the server function identifier included in the request message; obtaining by the server an execution result of the pre-processing; sending by the server a completion message to the client, the completion message including the execution result of the pre-processing; after the completion message has been sent, executing by the server post-processing corresponding to the server function identifier included in the request message; and executing, by the client, processing based on the execution result of the pre-processing.

In the above-described method, a completion message is returned to the client upon completion of the pre-processing. Since the minimum information necessary for the client is obtained through the pre-processing, the client can continue processing after receiving the completion message. Accordingly, the turnaround time can be reduced. In addition, the server executes the post-processing after the pre-processing, whereby a desired server function is called.

It is preferred that the method further comprises the steps of: obtaining by the server an execution result of the post-processing; sending by the server a post-processing result message to the client, the post-processing result message including the execution result of the post-processing; and executing, by the client, processing based on the execution result of the post-processing.

In the above-described method, since the client is notified of the execution result of the post-processing, the client can execute desired processing based on the execution result of the post-processing.

It is preferred that the method further comprises the steps of: if a cancel instruction to cancel the server function call is received, pre-registering by the client a condition used to determine whether to cancel the server function call based on the cancel instruction; if the cancel instruction is received, determining by the client whether to cancel the server function call based on the cancel instruction; and if it is determined to cancel the server function call, canceling by the client the server function call.

In the above-described method, since the server function call can be cancelled, the turnaround time in the case where an unnecessary server function call has been made, for example, can be reduced.

A second aspect of the present invention is directed to a server for executing a server function to be called by a client, comprising: a pre-processing registration section for registering pre-processing which is a part of processing corresponding to the server function and which is processing up to the point where the minimum information necessary for the client is obtained; a post-processing registration section for registering post-processing which is a part of the processing corresponding to the server function and which is processing to be executed after the pre-processing; and a server function correspondence section for establishing correspondence between the registered pre-processing and the registered post-processing with a server function identifier indicating the server function.

It is preferred that the server further comprises a receiving section for receiving from the client a request message which includes a server function identifier indicating a server function called by the client; a pre-processing execution section for executing pre-processing corresponding to the server function identifier included in the request message and outputting an execution result of the pre-processing; a sending section for sending to the client a completion message which includes the execution result of the pre-processing having been outputted by the pre-processing execution section; and a post-processing execution section for executing, after the sending section has sent the completion message, post-processing corresponding to the server function identifier included in the request message.

It is preferred that the post-processing execution section outputs an execution result of the post-processing, and the sending section sends to the client a post-processing result message which includes the execution result of the post-processing having been outputted by the post-processing execution section.

A third aspect of the present invention is directed to a client for making a desired server function call to a server, comprising: a sending section for sending a request message to the server to call a desired server function, the request message including a server function identifier which indicates the desired server function; a receiving section for receiving from the server a completion message which includes an execution result of pre-processing corresponding to the server function identifier included in the request message, the pre-processing being performed by the server; and a control section for executing processing based on the execution result of the pre-processing having been received by the receiving section, wherein the server function identifier has a correspondence with the pre-processing and pro-processing, the pre-processing being a part of processing corresponding to the server function and being processing up to the point where the minimum information necessary for the client is obtained, and the post-processing being a part of the processing corresponding to the server function and being processing to be executed after the pre-processing.

It is preferred that the server sends to the client a post-processing result message which includes an execution result of the post-processing, the receiving section receives the post-processing result message having been sent from the server, and the control section executes processing based on the execution result of the post-processing included in the post-processing result message.

It is preferred that the client further comprises: a cancel condition registration section for pre-registering, if a cancel instruction to cancel the server function call is received, a condition used to determine whether to cancel the server function call based on the cancel instruction, and that if the cancel instruction is received, the control section determines whether to cancel the server function call based on the condition registered in the cancel condition registration section, and if it is determined to cancel the server function call, the control section cancels the server function call.

As described above, according to the present invention, processing corresponding to the server function is divided into pre-processing and post-processing, and a completion message is returned to the client upon completion of the pre-processing. Since the minimum information necessary for the client is obtained through the pre-processing, the client can continue processing after receiving the completion message. Accordingly, the turnaround time can be reduced. In addition, the server executes the post-processing after the pre-processing, whereby a desired server function is called.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a diagram showing an exemplary correspondence table between server functions and pre- and post-processing which is held in a server function correspondence section 103;

DESCRIPTION OF THE PREFERRED EMBODIMENTS

With reference to the drawings, embodiments of the present invention will be described below.

(First Embodiment)

Figure 1:
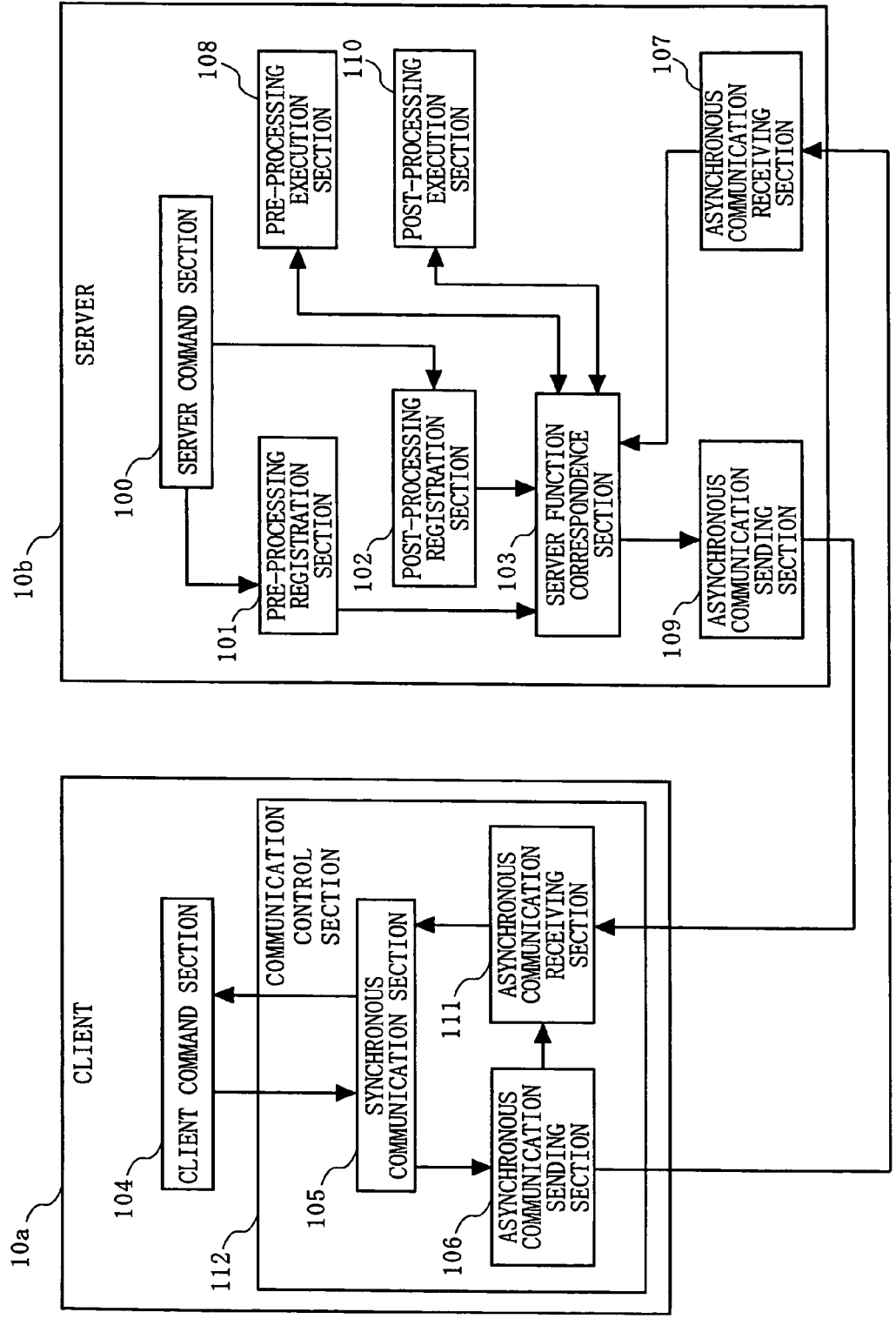
FIG. 1 is a block diagram showing an exemplary configuration of a client-server system according to a first embodiment of the present invention.

FIG. 1 is a block diagram showing an exemplary configuration of a client-server system according to a first embodiment of the present invention.

In FIG. 1, the client-server system includes a client 10a and a server 10b. The client 10a and the server 10b can communicate with each other. The present embodiment shows a client-server system in which the client 10a makes a server function call which is processed and executed on the server 10b to the server 10b through synchronous communication.

In the case where the client 10a and the server 10b are separate, individual apparatuses, the client 10a and the server 10b intercommunicate using wireless communication, such as Bluetooth, a wireless LAN, or infrared wireless communication, or wired communication, such as ISDN, ADSL, a serial cable, or a parallel cable, for example. In the case where the client 10a and the server 10b are provided in a single device, the client 10a and the server 10b intercommunicate between processes, tasks, or threads. Note that although in FIG. 1 a single client 10a and a single server 10b are provided, a plurality of clients 10a may be provided or a plurality of servers 10b may be provided.

The client 10a includes a client command section 104 and a communication control section 112. The client command section 104 executes a process on the client side and calls a server function in accordance with the process. The communication control section 112 controls communication between the client command section 104 and the server 10b.

The communication control section 112 has a synchronous communication section 105, an asynchronous communication sending section 106, and an asynchronous communication receiving section 111. The synchronous communication section 105 receives a server function call from the client command section 104 through synchronous communication and sends a request to the asynchronous communication sending section 106 to call the server function. In addition, the synchronous communication section 105 receives from the asynchronous communication receiving section 111 a completion message from the server and notifies the client command section 104 of completion of the server function. The asynchronous communication sending section 106 receives the call request from the synchronous communication section 105 and sends a request message to the server through asynchronous communication. The asynchronous communication receiving section 111 receives a completion message from the server and notifies the synchronous communication section 105 of completion.

The server 10b includes a server command section 100, a pre-processing registration section 101, a post-processing registration section 102, a server function correspondence section 103, an asynchronous communication receiving section 107, a pre-processing execution section 108, an asynchronous communication sending section 109, and a post-processing execution section 110.

The pre-processing registration section 101 registers pre-processing. Pre-processing is a part of processing corresponding to the server function having been called by the client 10a and is processing up to the point where the minimum information necessary for the client 10a is obtained. The server 10b sends the execution result of pre-processing to the client 10a before executing processing subsequent to the pre-processing (i.e., post-processing which will be described later).

The post-processing registration section 102 registers post-processing. Post-processing is a part of processing corresponding to the server function having been called by the client 10a and is processing to be executed after the server 10b sends the execution result of the pre-processing to the client 10a, i.e., apart of processing corresponding to the server function other than the pre-processing.

Pre- and post-processing will be described in examples described later.

The server command section 100 requests the pre-processing registration section 101 or the post-processing registration section 102 to register pre-processing or post-processing in response to an instruction of a server operator. The server command section 100 may make such a request in response to an instruction from a client connected to the server 10b or in response to an instruction from an application being executed on the server 10b.

Based on instructions from the pre-processing registration section 101 and the post-processing registration section 102, the server function correspondence section 103 creates and holds a correspondence table between server functions and pre- and post-processing. FIG. 2 is a diagram showing an exemplary correspondence table between server functions and pre- and post-processing, which is held in the server function correspondence section 103. As shown in FIG. 2, the server function correspondence section 103 registers identifiers representing server functions (hereinafter referred to as "server function identifiers") and their corresponding pre- and post-processing in a tabulated format. In the example shown in FIG. 2, pre-processing 1 is registered as the pre-processing of server function A and post-processing 2 is registered as the post-processing of server function A; pre-processing 2 is registered as the pre-processing of server function B and post-processing 1 is registered as the post-processing of server function B; and pre-processing 3 is registered as the pre-processing of server function C. In the case where such a table is registered in the server function correspondence section 103, for example, when server function A is requested by the client 10a, the server 10b executes pre-processing 1, sends the execution result of pre-processing 1 to the client 10a, and then executes post-processing 2.

The asynchronous communication receiving section 107 receives a request message from the client 10a to call a server function and passes the request message to the server function correspondence section 103. The server function correspondence section 103 requests the pre-processing execution section 108 to execute pre-processing. The pre-processing execution section 108 then returns the execution result of the pre-processing to the server function correspondence section 103. The server function correspondence section 103 creates a completion message based on the execution result of the pre-processing having been returned from the pre-processing execution section 108 and passes the completion message to the asynchronous communication sending section 109. The asynchronous communication sending section 109 sends the completion message to the client 10a through a synchronous communication. After the server function correspondence section 103 has passed the completion message to the asynchronous communication sending section 109, the server function correspondence section 103 requests the post-processing execution section 110 to execute post-processing corresponding to the called server function. In response to the request from the server function correspondence section 103, the post-processing execution section 110 executes the post-processing.

Figure 3:
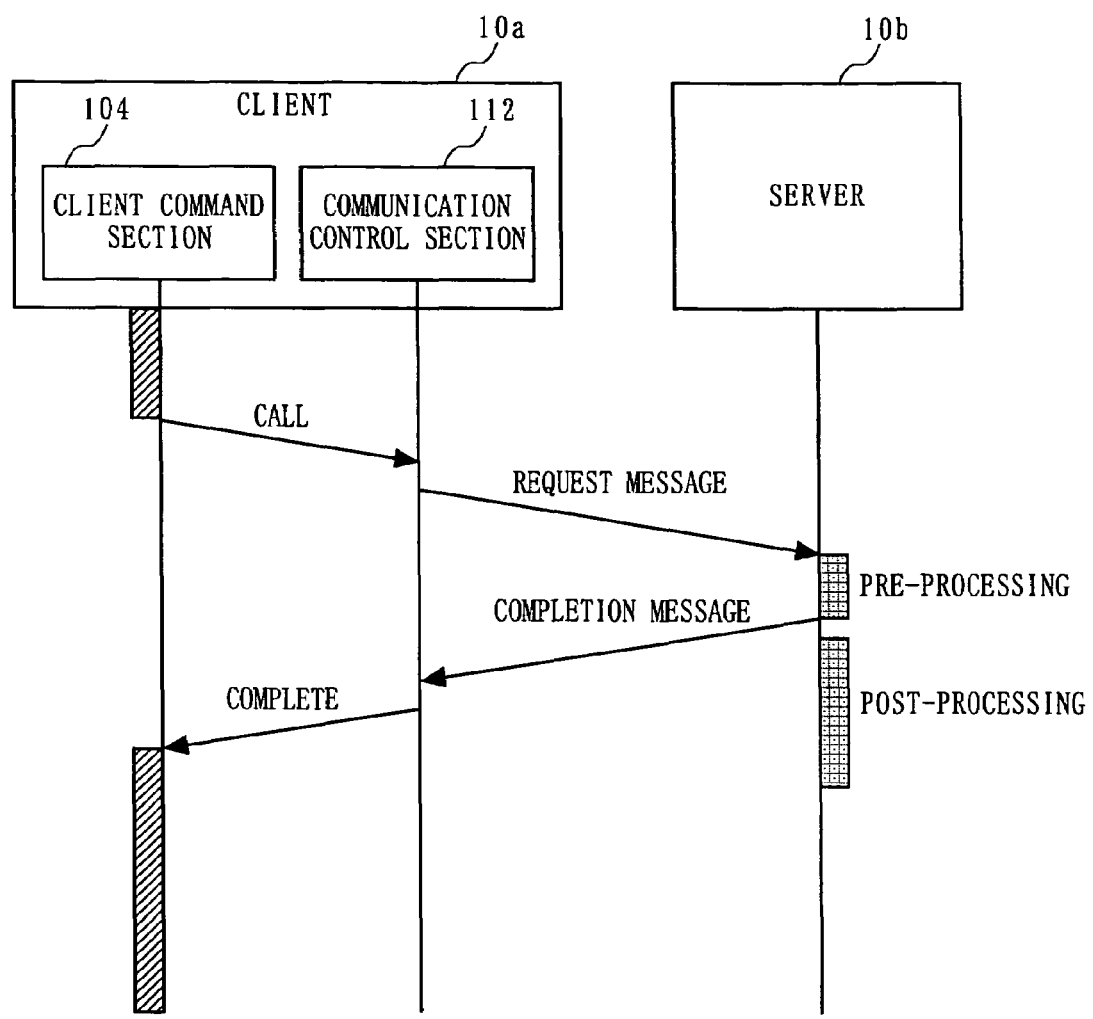
FIG. 3 is a sequence diagram for describing an outline of processing between a server 10b and a client 10a in the client-server system according to the first embodiment.

FIG. 3 is a sequence diagram for explaining an outline of processing between the server 10b and the client 10a in the client-server system according to the first embodiment. With reference to FIG. 3, the outline of processing between the server 10b and the client 10a in the client-server system according to the first embodiment will be described below.

In the case where the client command section 104 of the client 10a makes a request to call a server function, the communication control section 112 sends a request message to the server 10b though asynchronous communication to call the server function.

The server 10b having received the request message executes only pre-processing corresponding to the requested server function. Upon completion of the pre-processing, the server 10b sends a completion message to the client 10a to notify the client 10a of the execution result of the pre-processing. Thereafter, the server 10b executes post-processing.

When the communication control section 112 of the client 10a receives the completion message from the server 10b, the communication control section 112 notifies the client command section 104 that the server function call has been completed. In this manner, the client command section 104 can receive the execution result of the pre-processing.

Figure 4:
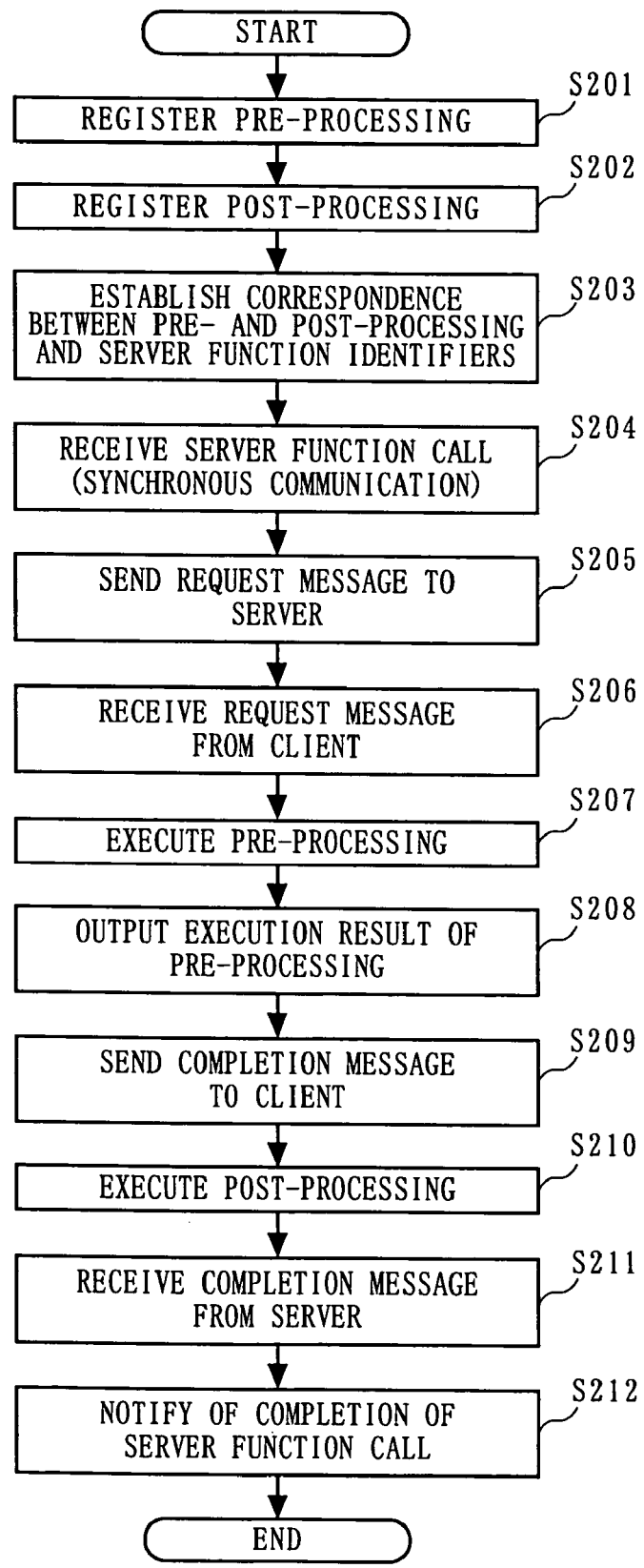
FIG. 4 is a flowchart showing the details of the whole operation of the client-server system according to the first embodiment of the present invention.

FIG. 4 is a flowchart showing the details of the whole operation of the client-server system according to the first embodiment of the present invention. With reference to FIG. 4, the details of the whole operation of the client-server system according to the first embodiment will be described below. In FIG. 4, steps S201 to S203 are operations performed by the server 10b. Steps S204 and S205 are operations performed by the client 10a. Steps S206 to S210 are operations performed by the server 10b. Steps S211 and S212 are operations performed by the client 10a.

First, the pre-processing registration section 101 of the server 10b receives a request from the server command section 100 to register pre-processing and performs a registration process (step S201). Subsequently, the post-processing registration section 102 receives a request from the server command section 100 to register post-processing and performs a registration process (step S202). Note that although in the present embodiment the registration requests at steps S201 and S202 are made by the server command section 100, the registration processes may be performed such that the server 10b receives registration requests from the client command section 104 of the client 10a and the registration requests are sent to the pre-processing registration section 101 and the post-processing registration section 102, respectively. Steps S201 and S202 may be performed when the server receives an instruction from a server operator, or when the server receives an instruction from a client connected thereto, or when the server receives an instruction from an application being executed on the server 10b.

Subsequently, the server function correspondence section 103 stores the registered pre- and post-processing so as to correspond to server function identifiers (step S203). Note that although in the present embodiment the server function correspondence section 103 establishes correspondence between the pre- and post-processing and the server function identifiers at a time after registering the pre- and post-processing, the correspondence may be established each time a registration process is performed at steps S201 and S202.

In the case where a request is made by the client command section 104 of the client 10a to call a specific server function, the synchronous communication section 105 receives the call request through synchronous communication (step S204). The server function call request includes information required to call the server function and address information required to establish synchronous communication by asynchronous communication, such as the server function identifier of the requested server function, source information, destination information, data required at the time of execution of pre-processing, and data required at the time of execution of post-processing.

Subsequently, the synchronous communication section 105 having received the server function call request allows the asynchronous communication sending section 106 to send a request message to the server 10b through asynchronous communication to call the server function (step S205).

The asynchronous communication receiving section 107 of the server 10b receives the request message from the client 10a (step S206).

The server function correspondence section 103 determines, with reference to a table held therein, pre-processing which corresponds to the server function identifier included in the received request message and then allows the pre-processing execution section 108 to execute the corresponding pre-processing (step S207). Note that only when data required at the time of execution of pre-processing is included in the request message received at step S206, the pre-processing execution section 108 executes the pre-processing using the data at step S207.

The pre-processing execution section 108 outputs the execution result of the pre-processing executed at step S207 to the server function correspondence section 103 (step S208).

The server function correspondence section 103 passes the execution result obtained from the pre-processing execution section 108 to the asynchronous communication sending section 109 and then allows the asynchronous communication sending section 109 to create a completion message which includes the execution result and to send the completion message to the client 10*a* through asynchronous communication (step S209). The completion message includes information necessary to inform the client 10*a* that the server function request has been completed, such as source information and destination information, as well as the execution result of the pre-processing. The address of the client 10*a* which is the destination is determined based on the source information included in the request message.

After the completion message has been sent to the client 10*a* at step S209, the server function correspondence section 103 determines post-processing which corresponds to the server function identifier and allows the post-processing execution section 110 to execute post-processing (step S210). Note that only when data required at the time of execution of post-processing is included in the request message received at step S206, the post-processing execution section 110 executes the post-processing using the data at step S210.

The asynchronous communication receiving section 111 of the client 10*a* receives the completion message from the server 10*b* and notifies the synchronous communication section 105 of completion (step S211).

The synchronous communication section 105 accordingly notifies the client command section 104 that the server function call has been completed (step S212). The completion notification includes the execution result of the pre-processing which is included in the completion message. The client command section 104 having received the notification continues desired processing.

As described above, in the first embodiment, the server 10*b* registers processing corresponding to a server function so as to be divided into pre-processing and post-processing. In the case where a request is made by the client 10*a* to execute a server function, the server 10*b* executes pre-processing corresponding to the server function and sends a completion message to the client 10*a* upon completion of the execution of the pre-processing. In this manner, the client 10*a* can receive a completion message before all processing (i.e., pre- and post-processing) corresponding to the server function has been completed and can execute desired processing, and thus the turnaround time can be reduced compared to the case where the client 10*a* receives a completion message after all processing corresponding to the server function has been completed and executes desired processing. In addition, by calling a server function only once, the client 10*a* can identify the point where the minimum necessary processing corresponding to the server function is completed, and thus the client 10*a* does not need to call the server function a plurality of times.

Note that the flowchart shown in FIG. 4 describes that the process of registering pre-processing (step S201), the process of registering post-processing (step S202), and the process of establishing correspondence (step S203) are performed sequentially with processes following the process at step S204; however, the processes at steps S201 to S203 are typically performed in advance independently of the processes following the process at step S204.

In the first embodiment, if step S201 where pre-processing is registered had not been performed in advance at the time of performing step S206 where the server 10*b* receives a request message from the client 10*a*, the server 10*b* may skip step S207 where pre-processing is executed and step S208 where the execution result of the pre-processing is outputted. In the present case, a completion message which does not include the execution result of pre-processing is sent at step S209.

In the first embodiment, as in the case of server function C shown in FIG. 2, for example, if step S202 where post-processing is registered had not been performed in advance at the time of performing step S206 where the server 10*b* receives a request message from the client 10*a*, the server 10*b* may skip step S208 where post-processing is executed. That is, it is not always necessary to perform both steps S201 and S202 where pre-processing and post-processing are registered, respectively.

(Variant of First Embodiment)

The foregoing first embodiment does not specifically describe the operation performed after the post-processing execution section 110 has completed the execution of post-processing. On the other hand, in a variant of the first embodiment, the server 10*b* may notify the client 10*a* of the execution result of post-processing.

Figure 5:
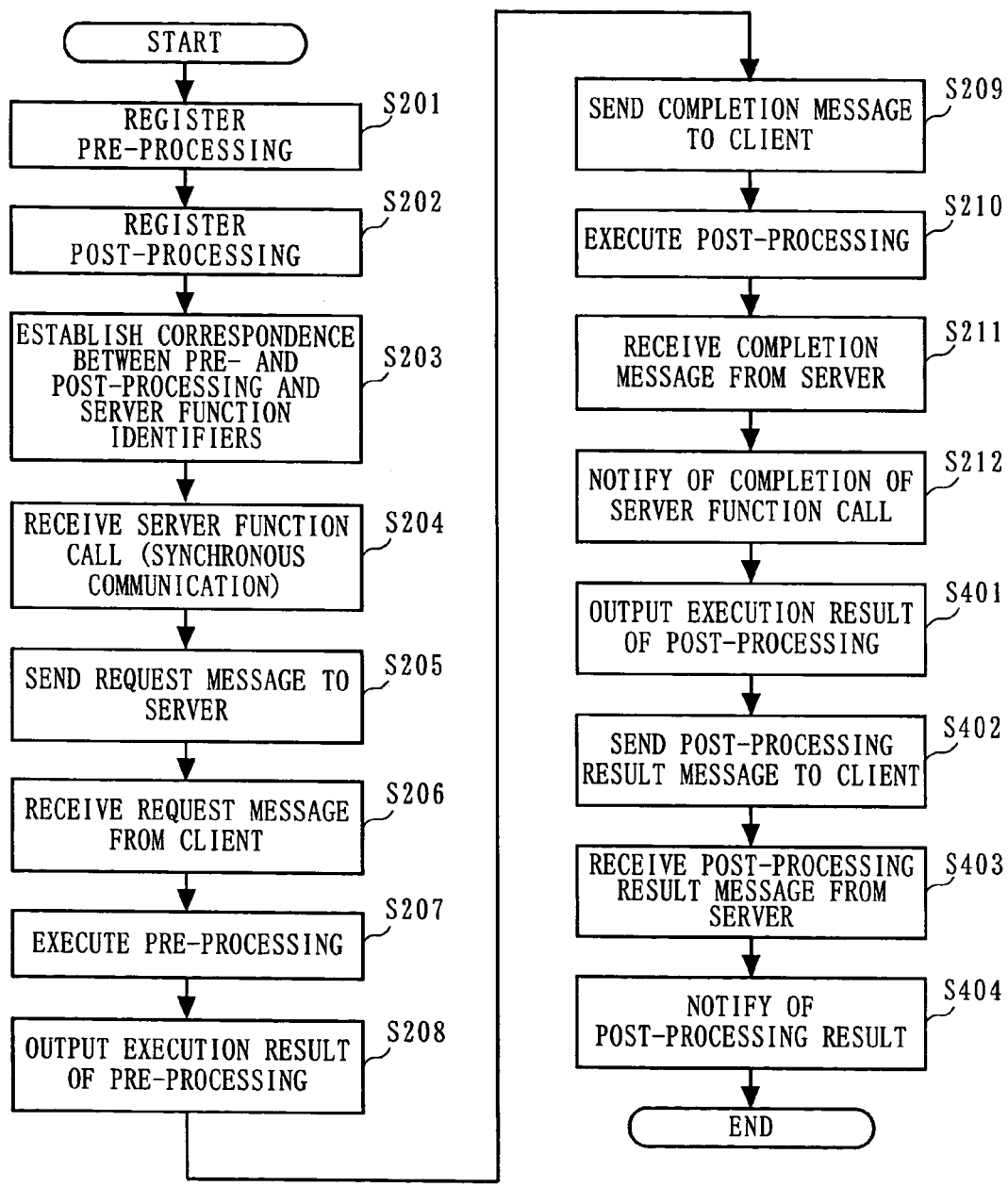
FIG. 5 is a flowchart showing the details of the whole operation of a client-server system capable of obtaining the execution result of post-processing.

FIG. 5 is a flowchart showing the details of the whole operation of a client-server system capable of obtaining the execution result of post-processing. With reference to FIG. 5, the details of the whole operation of a client-server system capable of obtaining the execution result of post-processing will be described below. Note that in FIG. 5 the steps indicating the same operations as those of the client-server system shown in FIG. 4 are designated by the same step numbers, and the description thereof will be omitted. In FIG. 5, steps S401 and S402 are operations performed by the server 10*b*. Specifically, the server 10*b* performs step S210 and then steps S401 and S402. Steps S403 and S404 are operations performed by the client 10*a*.

The post-processing execution section 110 of the server 10*b* having executed post-processing at step S210 outputs the execution result of the post-processing to the server function correspondence section 103 (step S401).

The server function correspondence section 103 then passes the execution result of the post-processing to the asynchronous communication sending section 109 and allows the asynchronous communication sending section 109 to create a post-processing result message which includes the execution result and then to send the post-processing result message to the client 10*a* through asynchronous communication (step S402). The post-processing result message includes information necessary to inform the client 10*a* that the server has completed all processing corresponding to the server function call, such as source information and destination information, as well as the execution result of the post-processing. The address of the client 10*a* which is the destination is determined based on the source information included in the request message.

Subsequently, the asynchronous communication receiving section 111 of the client 10*a* receives the post-processing result message from the server 10*b* (step S403).

The synchronous communication section 105 notifies the client command section 104 of the execution result of the post-processing which is included in the received post-processing result message, thereby notifying that the server has completed all processing corresponding to the server function call (step S404). The client command section 104 accordingly continues desired processing based on the execution result of the post-processing.

In this manner, the client can obtain the execution result of post-processing, whereby the client is informed that the server has completed all processing corresponding to the server function call.

(Second Embodiment)

A second embodiment of the present invention has a function in addition to the function described in the first embodiment that the client can process not only a completion message but also a cancel message indicating that the server function call has been canceled. The client having received a cancel message cancels the server function call. With reference to the drawings, the second embodiment will be described below.

Figure 6:
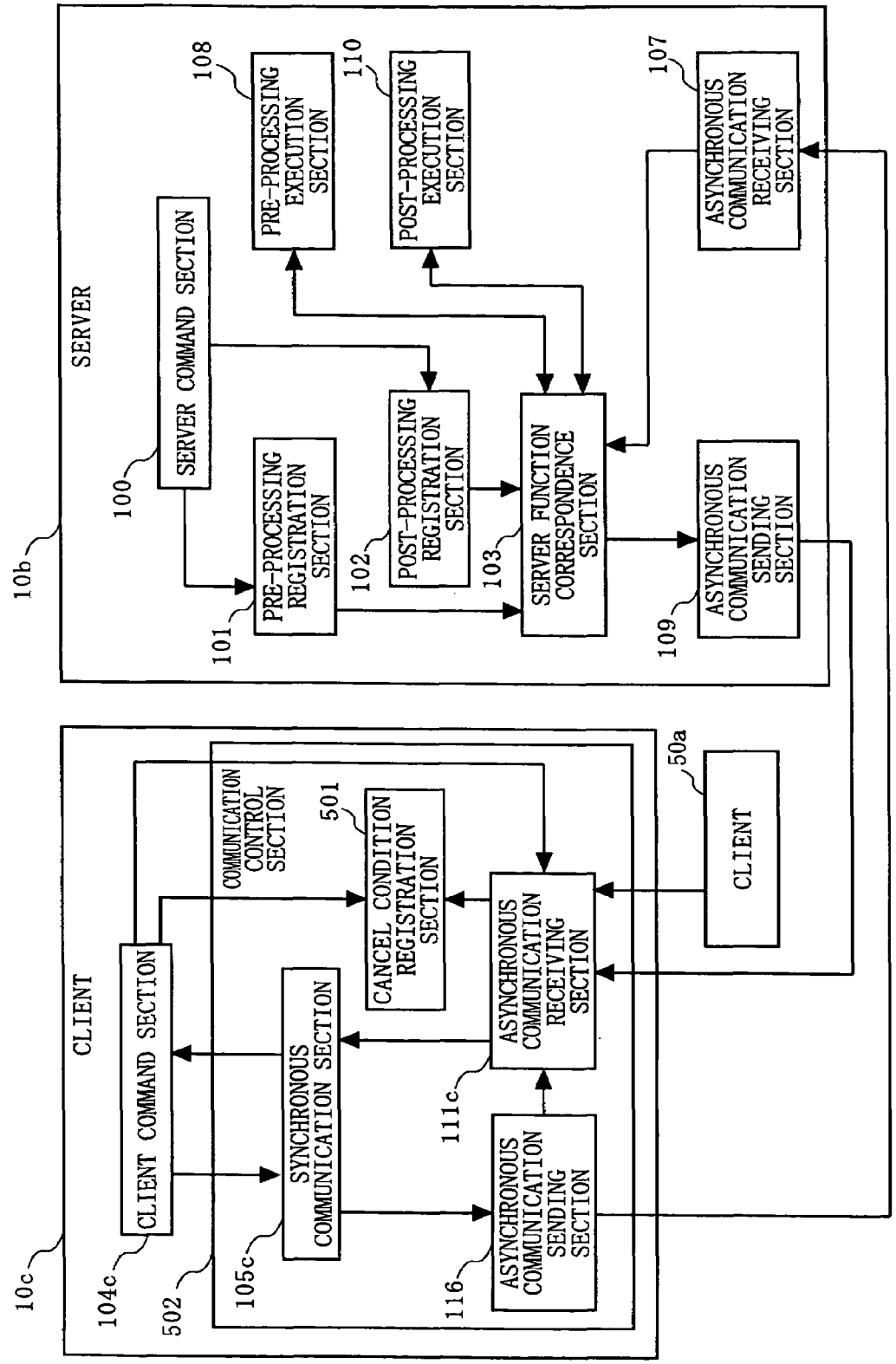
FIG. 6 is a block diagram showing an exemplary configuration of the entire client-server system according to a second embodiment of the present invention.

FIG. 6 is a block diagram showing an exemplary configuration of the entire client-server system according to the second embodiment of the present invention. Note that in FIG. 6 the same components having the same functions as those shown in FIG. 1 are designated by the same reference numerals, and the description thereof will be omitted.

In FIG. 6, a client 10c according to the second embodiment includes a client command section 104c and a communication control section 502. The communication control section 502 has a synchronous communication section 105c, an asynchronous communication sending section 106, an asynchronous communication receiving section 111c, and a cancel condition registration section 501.

The cancel condition registration section 501 registers a condition used to determine whether to cancel the server function call based on information included in a cancel message.

Figure 7:
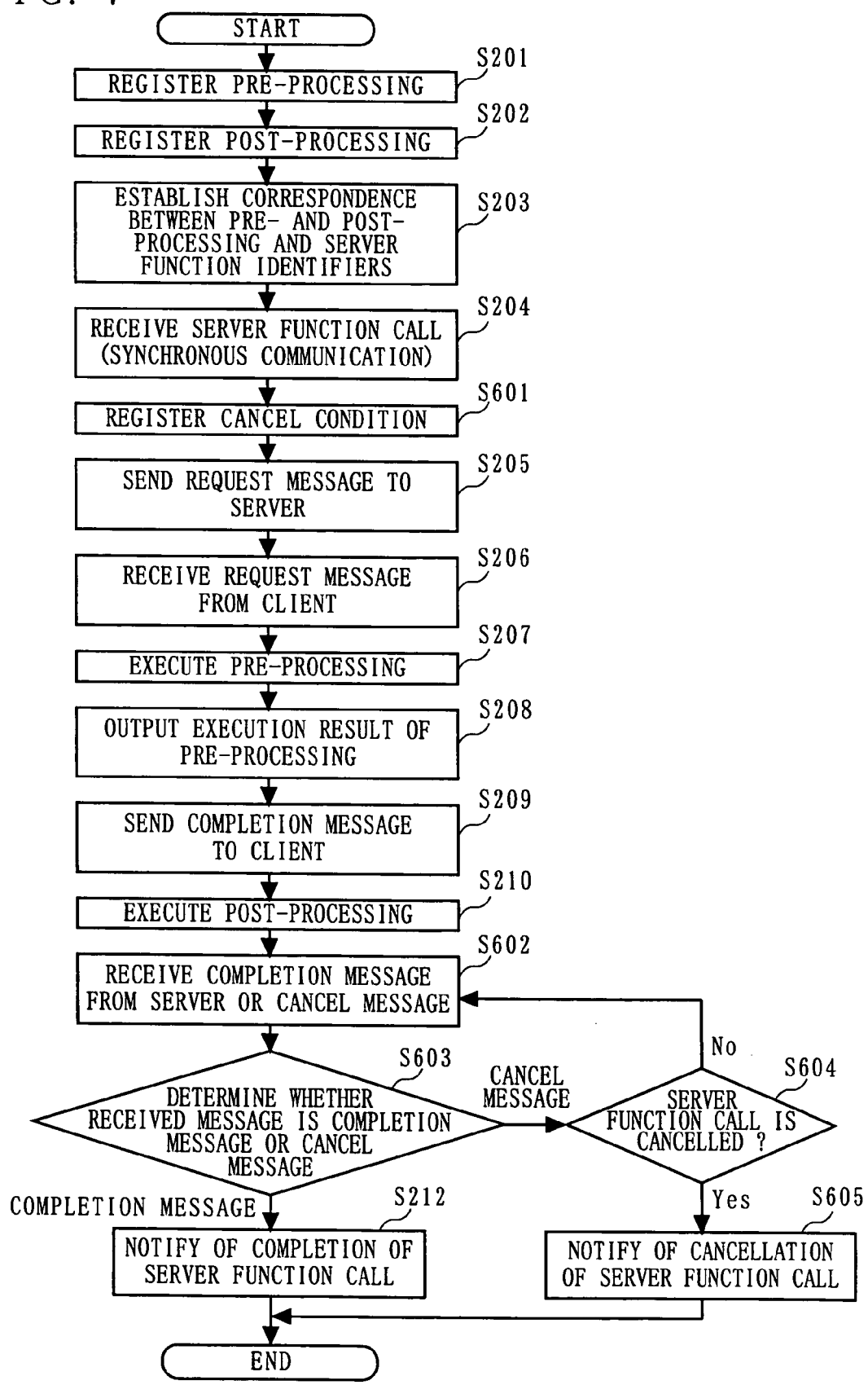
FIG. 7 is a flowchart showing the whole operation of the client-server system according to the second embodiment.

FIG. 7 is a flowchart showing the whole operation of the client-server system according to the second embodiment. With reference to FIG. 7, the operation where the client clears a state of waiting for a complete message will be described below. Note that in FIG. 7 the same operations as those shown in FIG. 4 are designated by the same step numbers, and the description thereof will be omitted.

The client command section 104c pre-registers in the cancel condition registration section 501 a condition used to determine, when the client 10c receives a cancel message, whether to cancel the server function call based on the cancel message (step S601). The operation of step S601 can be performed anytime before or after any of steps S201, S202, S203, and S204 or can be performed in advance totally independently of these operations.

At step S602, the asynchronous communication sending section 111c of the client 10c receives a completion message from the server 10b or a cancel message. Note that the message the asynchronous communication receiving section 111c receives at S602 is any of a completion message sent from the server 10b at step S209, a cancel message sent from the client command section 104c, and a cancel message sent from another client 50a.

Subsequently, the asynchronous communication receiving section 111c determines whether the message received at step S602 is a cancel message or a completion message (step S603). If it is determined to be a completion message, the client 10c proceeds to the operation of step S212.

On the other hand if it is determined to be a cancel message, the asynchronous communication receiving section 111c determines whether to cancel the server function call based on the determination condition registered at step S601 in the cancel condition registration section 501 (step S604).

If it is determined at step S604 to cancel the server function call, the asynchronous communication receiving section 111c notifies the synchronous communication section 105c that the server function call has been canceled. The synchronous communication section 105c accordingly notifies the client command section 104c that the server function call has been cancelled (step S605). Upon reception of notification, the client command section 104c clears its synchronization return wait state. On the other hand, if it is determined at step S604 not to cancel the server function call, the asynchronous communication receiving section 111c returns to the operation of step S602 and resumes receiving a message.

As described above, according to the second embodiment, the communication control section 502 of the client 10c can receive a cancel message as well as a completion message. The communication control section 502 can register therein a condition used to determine, when receiving a cancel message, whether to cancel the server function call. In the case where the communication control section 502 receives a cancel message, the communication control section 502 determines whether to cancel the server function call process based on the above-described condition. If it is determined to cancel the server function call, the server function call made by the client is cancelled in the middle of the process, whereby the turnaround time can be reduced.

If the client 10c receives a completion message from the server 10b after the server function call has been cancelled, the client 10c may discard the completion message.

(First Variant of Second Embodiment)

The asynchronous communication sending section 106 of the client 10c which has cancelled the server function call in response to the reception of a cancel message may send to the server 10b not only a request message but also a client-to-server cancel message indicating that the server function call has been cancelled. In this case, the asynchronous communication receiving section 107 of the server 10b may receive not only a request message but also a client-to-server cancel message as the message to be sent from the asynchronous communication sending section 106. In the case where the asynchronous communication receiving section 107 receives a client-to-server cancel message, the server 10b suspends or completes the execution of the server function, and does not send a response to the server function call to the client 10c. This operation will be described in detail in FIG. 8.

Figure 8:
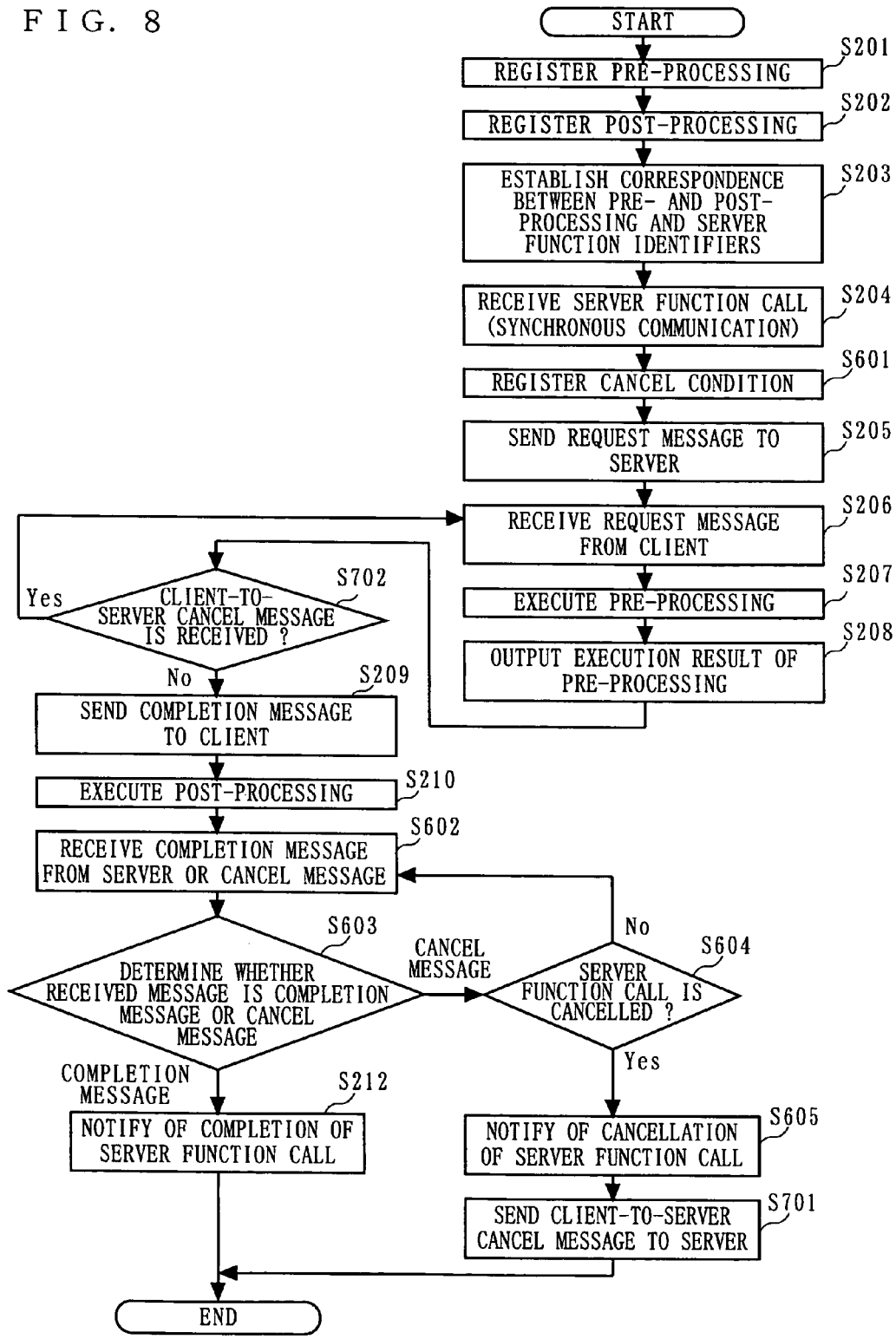
FIG. 8 is a flowchart showing the whole operation of a client-server system in the case where a client notifies a server that a server function call has been cancelled.

FIG. 8 is a flowchart showing the whole operation of a client-server system in the case where the client notifies the server that the server function call has been cancelled. With reference to FIG. 8, the whole operation of a client-server system in the case where the client has cancelled the server function call will be described below. Note that in FIG. 8 the steps indicating the same operations as those of FIG. 7 are designated by the same step numbers, and the description thereof will be omitted.

If it is determined at step S604 to cancel the server function call, the asynchronous communication receiving section 111c notifies the synchronous communication section 105c that the server function call has been cancelled (step S605). The synchronous communication section 105c accordingly allows the asynchronous communication sending section 106 to send a client-to-server cancel message to the server 10b (step S701).

After the execution result of pre-processing has been outputted (step S208), the server 10b determines whether the server 10b has received a client-to-server cancel message from the client 10c (step S702). If it is determined at step S702 that the server 10b has not received a client-to-server cancel message, the server 10b proceeds to the operation of step S209. On the other hand, if it is determined that the server 10b has received a client-to-server cancel message, the server 10b proceeds to the operation of step S206 where the server 10b receives another request message from the client 10c, without performing the operations of steps S209 and S210, and suspends or completes the execution of the server function.

According to the above method, in the case where a client-to-server cancel message is sent to the server 10*b* from the client 10*c*, the server 10*b* does need to send a response to the server function call to the client 10*c*. That is, after executing the pre-processing, the server 10*b* does not notify the client 10*c* of the execution result of the pre-processing. In addition, even if post-processing is registered at step S202, the server 10*b* does not need to execute the post-processing which has become unnecessary.

(Second Variant of Second Embodiment)

In the foregoing first variant, in the case where the client 10*c* receives a cancel message, the asynchronous communication sending section 106 of the client 10*c* cancels the server function call and then sends a client-to-server cancel message to the server 10*c*. In this case, the asynchronous communication sending section 106 having sent the client-to-server cancel message may send a resume message to resume the execution of the suspended server function. Here, the asynchronous communication receiving section 107 of the server 10*b* can receive not only a request message and a client-to-server cancel message but also a resume message. When the server 10*b* receives a resume message from the client 10*c* to resume the execution of the suspended server function, the server 10*b* executes post-processing which has not been executed in response to the reception of the client-to-server cancel message, whereby the execution of the suspended server function can be resumed. The operation will be described in detail in FIG. 9.

Figure 9:
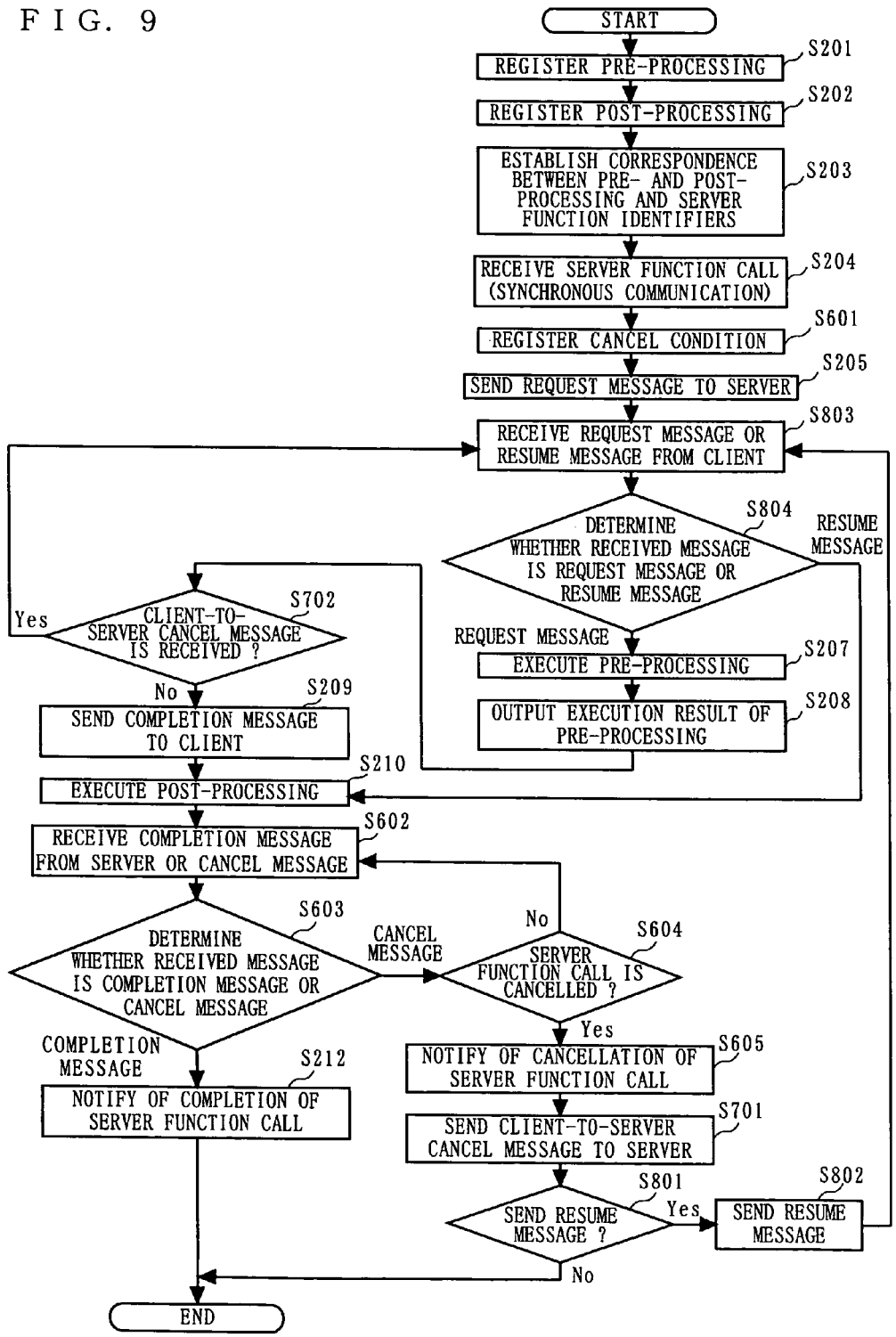
FIG. 9 is a flowchart showing the whole operation of a client-server system in the case where a client sends a resume message to a server.

FIG. 9 is a flowchart showing the whole operation of a client-server system in the case where the client sends a resume message to the server. With reference to FIG. 9, the operation of a client-server system in the case where the client sends a resume message to the server will be described below. In FIG. 9, the steps indicating the same operations as those of FIG. 8 are designated by the same step numbers, and the description thereof will be omitted.

After the client 10*c* has sent a client-to-server message to the server 10*b* at step S701, the client command section 104*c* determines whether to send a resume message to the server 10*b* to resume the execution of a suspended server function (step S801). If it is determined to send a resume message, the client command section 104*c* allows the synchronous communication section 105*c* and the asynchronous communication sending section 106 to send a resume message to the server 10*b* (step S802). Note that the operation of step S801 can be performed anytime after the operation of step S701.

After step S205, the server 10*b* receives either a request message or a resume message from the client 10*c* (step S803).

The server 10*b* then determines whether the message received at step S803 is a request message or a resume message (step S804). If it is determined that the message is a request message, the server 10*b* proceeds to the operation of step S207. On the other hand, if it is determined that the message is a resume message, the server 10*b* proceeds to the operation of step S210 and executes post-processing.

According to the above method, in the case where the server 10*b* receives a resume message from the client 10*c* after receiving a client-to-server cancel message, the server 10*b* executes post-processing which has not been executed because of the cancellation of the server function call. By this, the execution of the suspended server function can be resumed.

Now, examples of the present invention will be described using concrete examples as to a server function, pre-processing, and post-processing.

FIRST EXAMPLE

A first example of the present invention describes a client-server system in the case where an image decode server is used as the server.

Conventionally, in the case where a client requests the server to perform an image decoding process as a server function, the server performs an image decoding process and then sends a decoded image to the client, and then the server resumes control. This processing flow, however, causes a delay in displaying a layout on the client. To overcome this problem, an image decode server according to the first example of the present invention registers, among image decoding processes, the processing for obtaining the size of an image as pre-processing and registers the processing for decoding the image as post-processing. By this, the problem of the delay in displaying a layout can be overcome. In the pre-processing in the present example, information about the size of a requested image is obtained as the minimum necessary information for the client.

Figure 10:
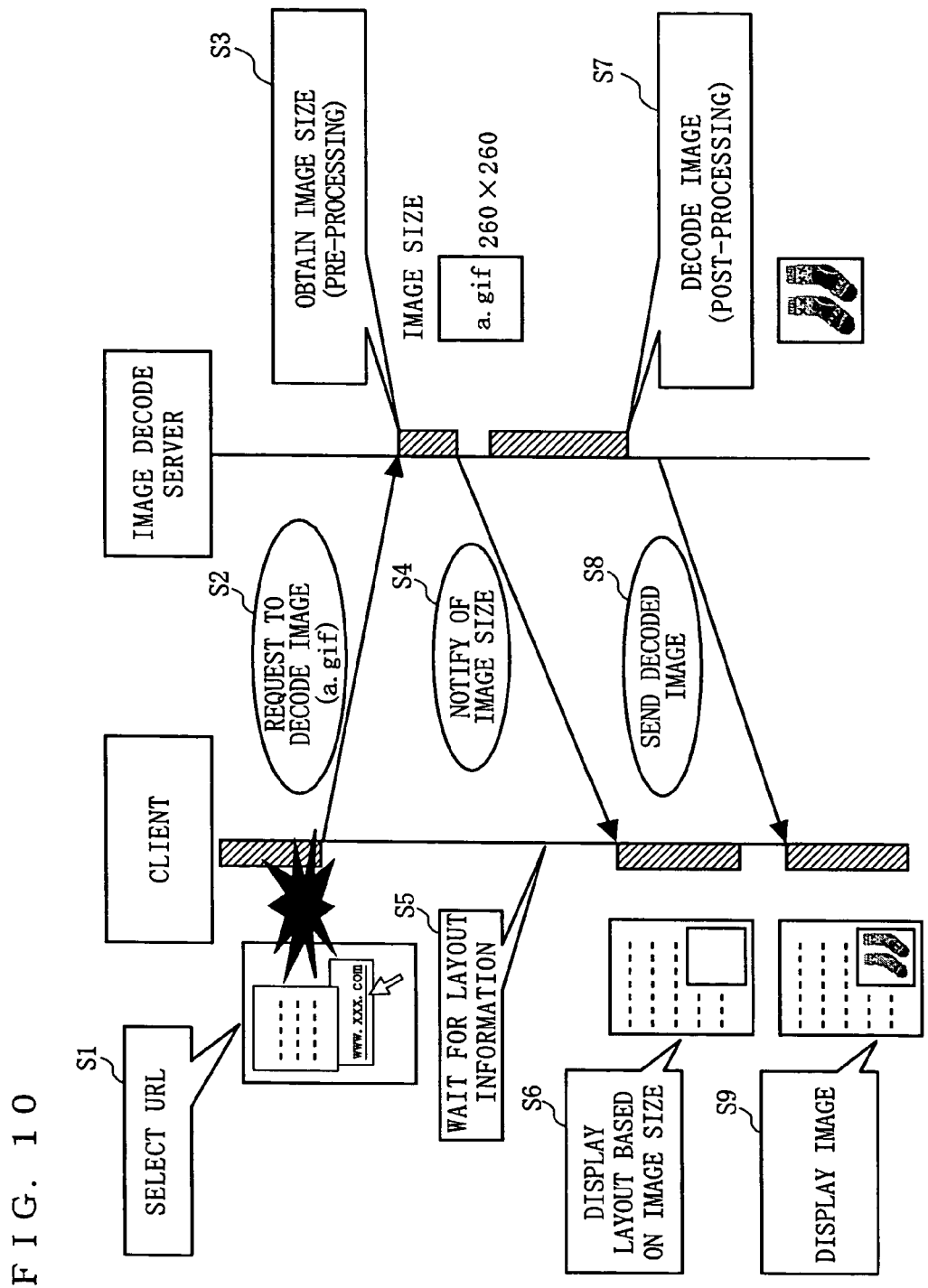
FIG. 10 is a sequence diagram schematically showing the flow of processing in a client-server system according to a first example.

FIG. 10 is a sequence diagram schematically showing the flow of processing in a client-server system according to the first example. As shown in FIG. 10, when the client selects a URL (step S1), the client sends image data displayed in the URL to an image decode server and requests, as a server function, the image decode server to decode the image (step S2).

In response to the request, the image decode server obtains, as pre-processing, the size of the requested image (step S3) and notifies the client of the size of the image as the execution result of the pre-processing (step S4).

The client waits for layout information which includes the size of the requested image (step S5). When the client receives a notification of the size of the image, the client arranges an image region where the image is embedded based on the size of the image and then displays a layout (step S6).

After the pre-processing, the image decode server decodes the image as post-processing (step S7). Upon completion of the post-processing, the image decode server sends the decoded image to the client as the execution result of the post-processing (step S8).

The client accordingly displays the image having been sent thereto in the image region (step S9).

As described above, in the first example, in pre-processing, the server obtains in advance information only about the size of an image which is the minimum necessity for the client to display a layout, and then sends the size information to the client. Thereafter, the server decodes the image as post-processing and then sends the decoded image to the client. In this manner, the client can start the layout process without the need to wait for the server to complete the decode processing.

SECOND EXAMPLE

A second example of the present invention describes a client-server system in the case where a Kana-Kanji conversion server is used as the server.

Conventionally, in the case where the server attempts to perform the process of obtaining predictive data at the point when the client specifies Kanji candidates, the obtaining process requires some time and therefore it takes time for the client to display the predictive data. On the other hand, in order to improve the response time to display predictive data, if the client attempts to obtain predictive data at the same time as the client requests the server to obtain candidates, it takes time for the client to display the candidates. To overcome the problems, a Kana-Kanji conversion server according to the second example of the present invention registers, among Kana-Kanji conversion processing, the processing for extracting candidates as pre-processing and registers the processing for obtaining predictive data as post-processing. In the pre-processing in the present example, information about Kana-Kanji conversion candidates is obtained as the minimum necessary information for the client.

Figure 11:
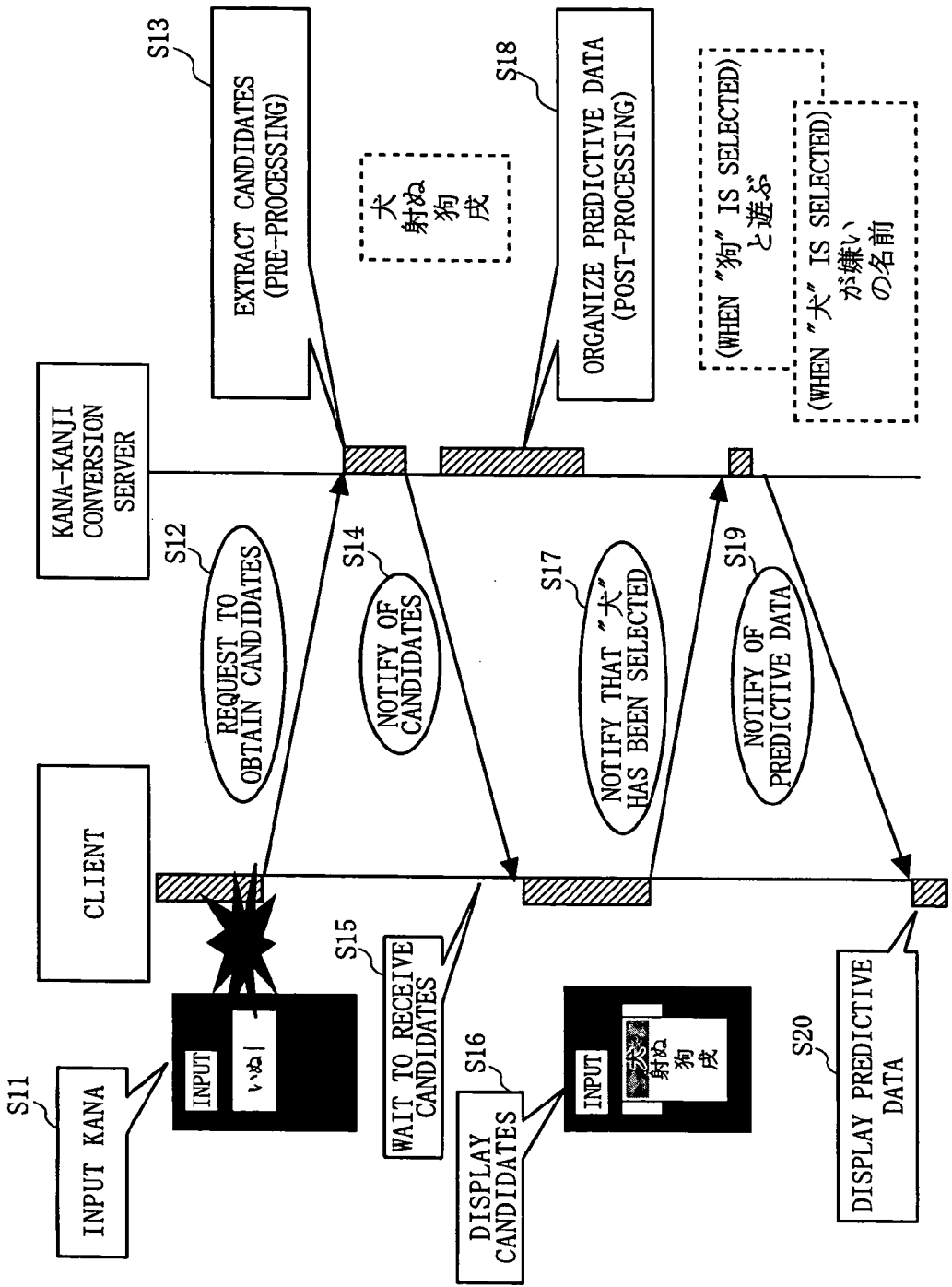
FIG. 11 is a sequence diagram schematically showing the flow of processing in a client-server system according to a second example.

FIG. 11 is a sequence diagram schematically showing the flow of processing in a client-server system according to the second example. As shown in FIG. 11, when the client inputs Kana (step S11), the client requests the Kana-Kanji conversion server to obtain conversion candidates (step S12).

In response to the request, the Kana-Kanji conversion server extracts, as pre-processing, conversion candidates corresponding to the sent Kana (step S13), and then sends the conversion candidates to the client as the execution result of the pre-processing (step S14).

The client waits to perform processing until the client is notified of the conversion candidates by the Kana-Kanji conversion server (step S15). When the client is notified of the conversion candidates, the client displays the conversion candidates (step S16). Subsequently, the client select one candidate from the conversion candidates and notifies the server of the determined result (step S17). Here, it is assumed that "*" is selected.

After the pre-processing, the Kana-Kanji conversion server organizes, as post-processing, predictive data corresponding to the conversion candidates (step S18). For example, the Kana-Kanji conversion server organizes predictive data such that if "*" is selected, "*" is extracted as predictive data, and if "*" is selected, "*" and "*" are extracted as predictive data. Since in the present example, "*" has been selected, the Kana-Kanji conversion server notifies the client of predictive data corresponding to "*" as the result of the post-processing (step S19).

The client accordingly displays the notified predictive data (step S20).

As described above, in the second example, the processing for extracting conversion candidates is registered as pre-processing and the processing for organizing predictive data is registered as post-processing. At the time when the processing for extracting conversion candidates has been completed, the server allows the client to resume control. In this manner, since the display of conversion candidates by the client and the organization of predictive data by the server are performed concurrently, the response time to display predictive data at the time of specifying a Kanji candidate can be reduced.

THIRD EXAMPLE

A third example of the present invention describes a client-server system in the case where a video playback application server is used as the server.

In the third example, the "active state" indicates that an application is being currently operated by a user and the "inactive state" indicates that an application is not being currently operated by the user. An application used in the third example may be a resident application or may be a non-resident application. Here, the resident application refers to an application which, after receiving an inactive request, goes into an inactive state while operating. The non-resident application refers to an application which is completely stopped upon reception of an inactive request. In the following description, each application is a resident application.

In mobile terminals such as mobile phones, when a telephone application receives a phone call request, the telephone application plays the ring tone to inform the user that there is an incoming call. A video playback application server reproduces a moving image with sound. Since mobile terminals can not normally output two or more sounds at the same time, a contention arbitration application determines contention between applications (e.g., the telephone application and the video playback application server) and allows each application to transition from its active state to its inactive state. Conventionally, in the case where there is an incoming call when the video playback application server is in an active state, the telephone application requests the contention arbitration application to bring the telephone application to an active state. The contention arbitration application then requests the video playback application server to go into an inactive state. In response to the inactive request, the video playback application server stops video playback with sound, stores intermediate information, and then notifies the contention arbitration application that the video playback application has gone into an inactive state. The contention arbitration application accordingly notifies the telephone application that the telephone application is permitted to go into an active state. The telephone application then starts playing the ringtone. In the conventional method, as described above, the telephone application has to wait to start playing the ringtone until the video playback application stores intermediate information, resulting in a long turnaround period.

To overcome the problem, upon reception of an inactive request, a video playback application according to the third example of the present invention registers, among processing for bringing the video playback application to an inactive state, the processing for stopping video playback with sound as pre-processing and registers the processing for storing intermediate information about the video playback application as a file as post-processing.

Figure 12:
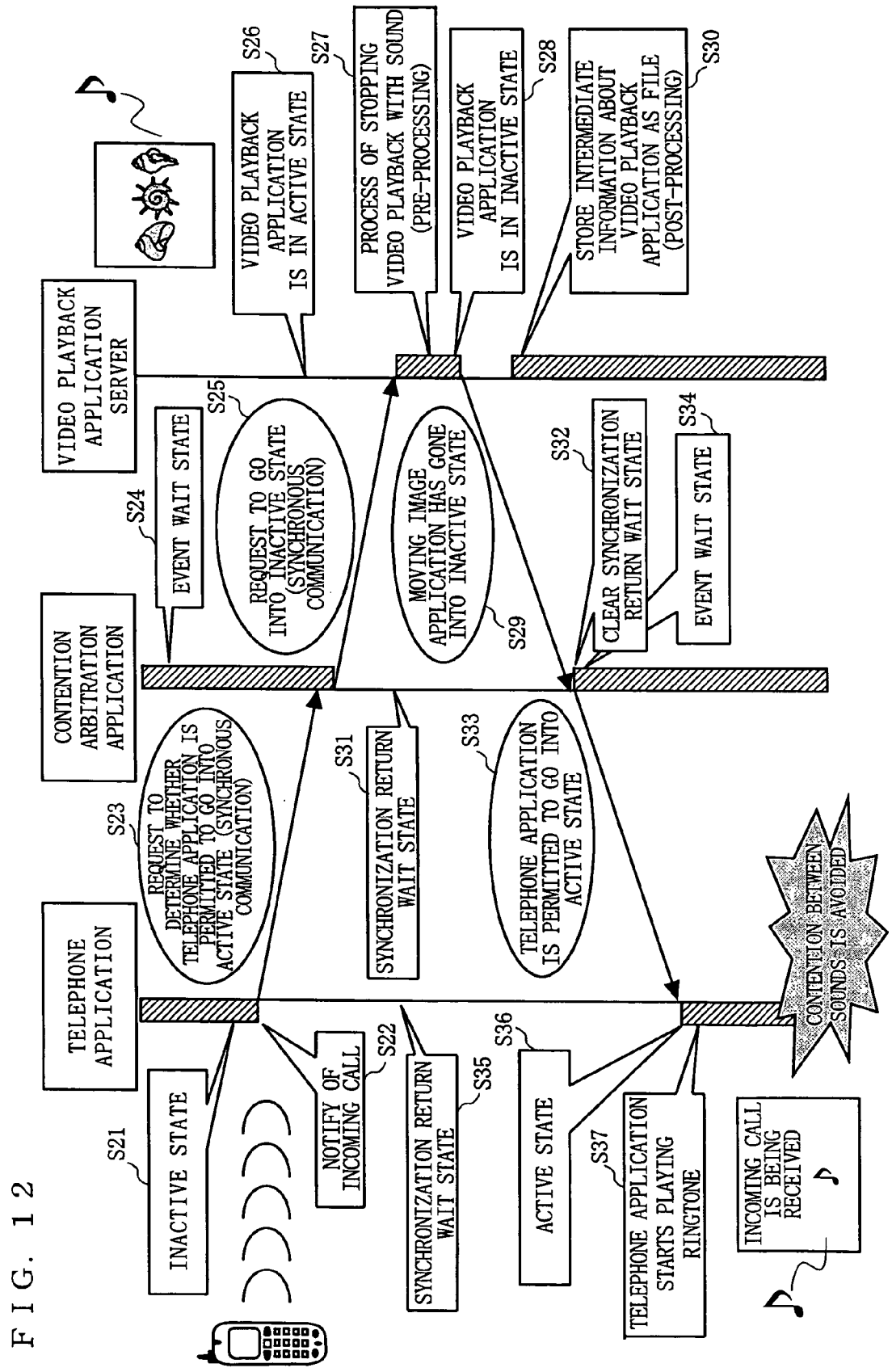
FIG. 12 is a sequence diagram schematically showing the flow of processing in a client-server system according to a third example.
Figure 13:
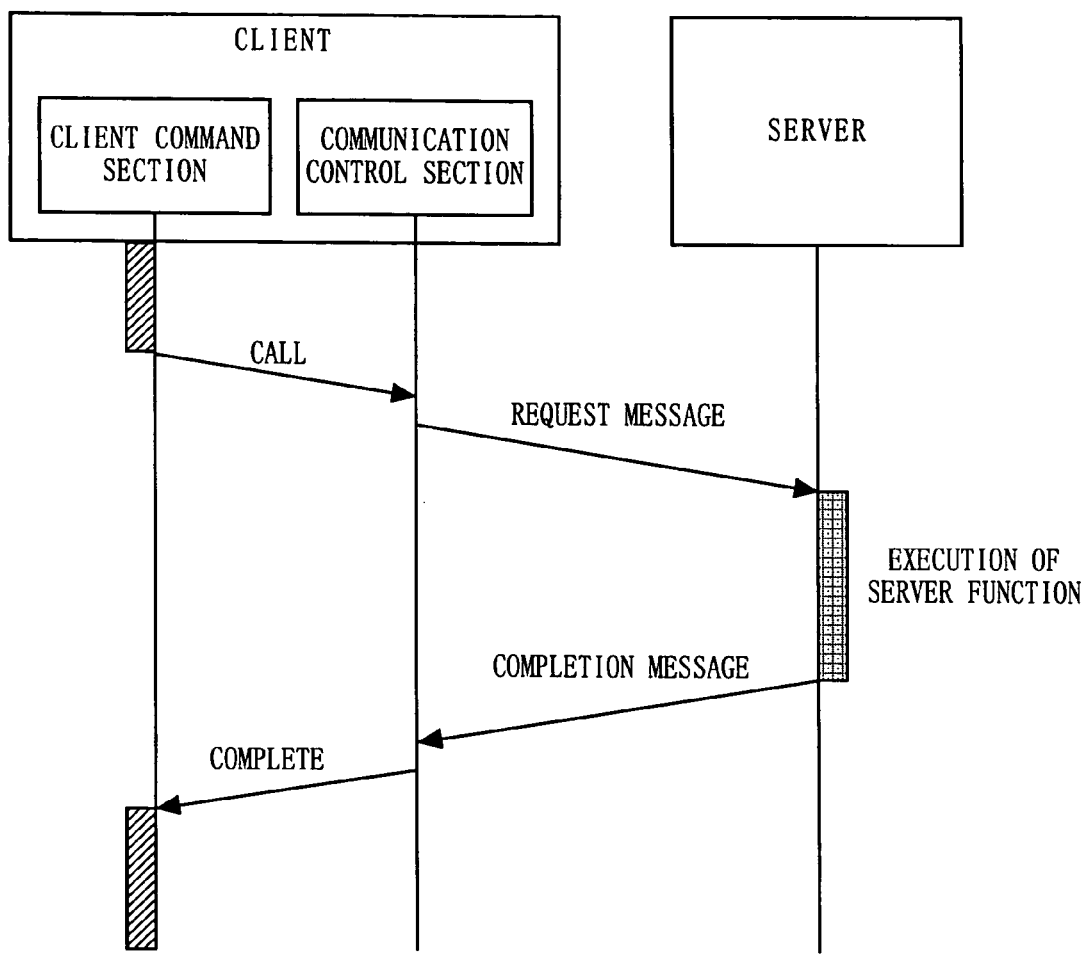
FIG. 13 is a sequence diagram showing the flow of processing between a server and a client in a conventional synchronous communication method.
Figure 14:
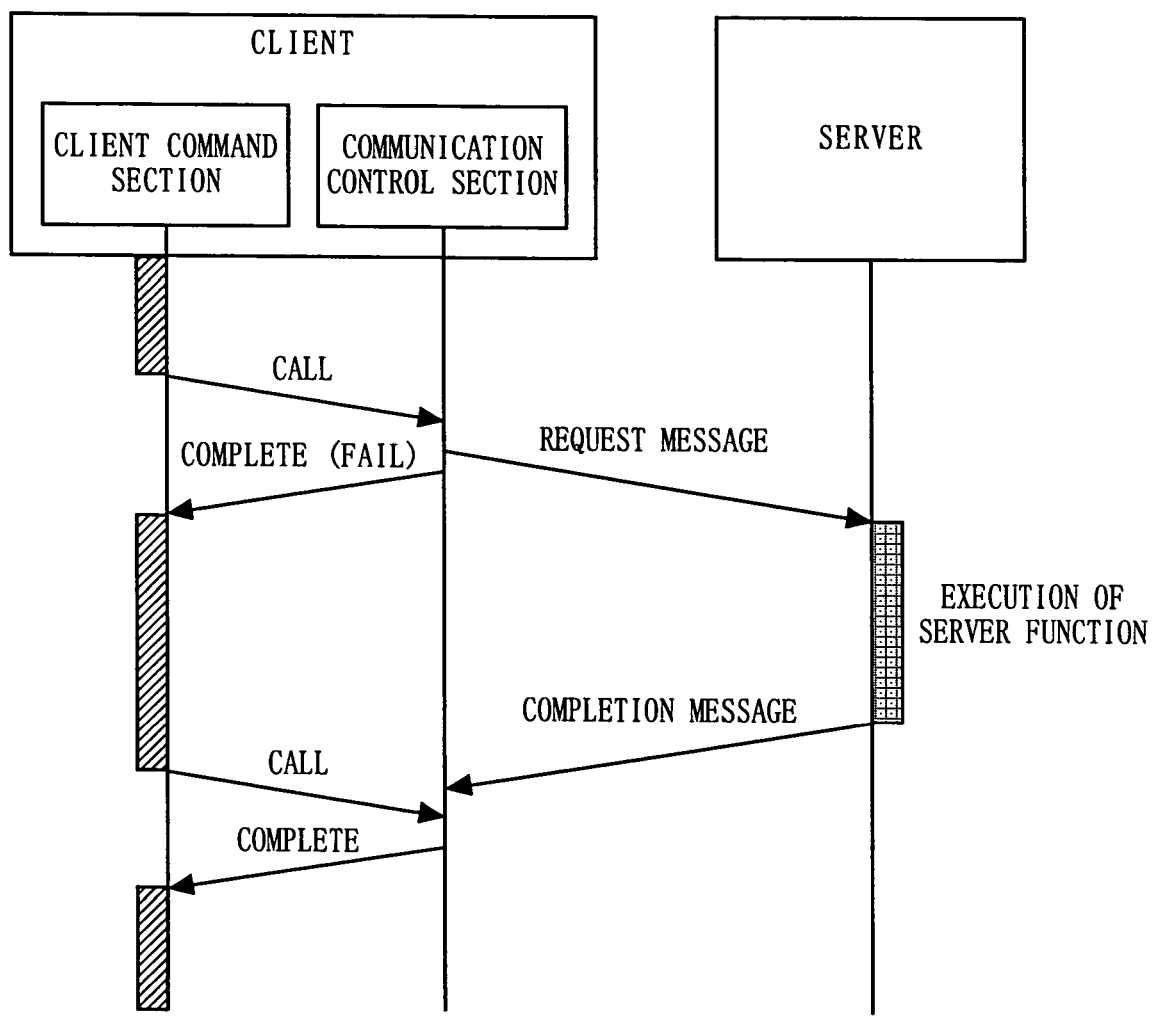
FIG. 14 is a sequence diagram showing the flow for a conventional synchronous communication method described in Japanese Laid-Open Patent Publication No. 9-330287.

FIG. 12 is a sequence diagram schematically showing the flow of processing in a client-server system according to the third example. As shown in FIG. 12, when a telephone application is in an inactive state (step S21), the telephone application has received an incoming call notification (step S22). The telephone application accordingly requests through synchronous communication a contention arbitration application to determine whether the telephone application is permitted to go into an active state (step S23), and thereby going into a synchronization return wait state (step S35).

The contention arbitration application being in an event wait state (step S24) accordingly requests through synchronous communication a video playback application server to go into an inactive state (step S25), and thereby going into a synchronization return wait state (step S31).

As pre-processing, the video playback application server being in an active state (step S26) stops video playback with sound being performed (step S27), and thereby going into an inactive state (step S28). The video playback application sever then sends an OK notification to the contention arbitration application that the video playback application server has gone into an inactive state (step S29). Thereafter, as post-processing, the video playback application server stores intermediate information about the video playback application as a file (step S30). The intermediate information includes information about the stopping point, the display position of a moving image, color adjustment, etc. By storing such intermediate information as a file, the video playback application server can resume the video playback.

When the contention arbitration application being in a synchronization return wait state (step S31) receives the OK notification from the video playback application server, the contention arbitration application clears its synchronization return wait state (step S32), and sends an OK notification to the telephone application that the telephone application is permitted to go into an active state (step S33), and thereby going into an event wait state (step S34).

In response to the OK notification from the contention arbitration server, the telephone application transitions from the synchronization return wait state (step S35) to an active state (step S36), and then starts playing the ringtone thereof (step S37). In this manner, contention between sounds can be avoided.

As described above, in the third example, the minimum necessary processing for avoiding contention between sounds is registered as pre-processing and the processing for preparing for video playback again is registered as post-processing, whereby the turnaround period in the telephone application and the contention arbitration application can be reduced.

As described above, the method, server, and client used in a client-server system according to the present invention make it possible to reduce the turnaround time from when the client makes a server function request through synchronous communication until the client receives a notification of completion of the server function, and thus are useful for apparatuses or systems with poor hardware performance, such as mobile phones and PDAs.

While the invention has been described in detail, the foregoing description is in all aspects illustrative and not restrictive. It is understood that numerous other modifications and variations can be devised without departing from the scope of the invention.

What is claimed is:

1. A method used in a client-server distributed system in which a client makes a desired server function call to a server and the server executes processing corresponding to the called server function, the method comprising the steps of:
   registering pre-processing which is a part of the processing corresponding to the server function and which is processing up to the point where the minimum information necessary for the client is obtained;
   registering post-processing which is a part of the processing corresponding to the server function and which is processing to be executed after the pre-processing; and
   establishing correspondence between the registered pre-processing and the registered post-processing with a server function identifier indicating the server function.

2. The method according to claim 1 further comprising the steps of:
   sending by the client a request message to the server to call a desired server function, the request message including a server function identifier which indicates the desired server function;
   receiving by the server the request message from the client;
   executing by the server pre-processing corresponding to the server function identifier included in the request message;
   obtaining by the server an execution result of the pre-processing;
   sending by the server a completion message to the client, the completion message including the execution result of the pre-processing;
   after the completion message has been sent, executing by the server post-processing corresponding to the server function identifier included in the request message; and
   executing, by the client, processing based on the execution result of the pre-processing.

3. The method according to claim 2 further comprising the steps of:
   obtaining by the server an execution result of the post-processing;
   sending by the server a post-processing result message to the client, the post-processing result message including the execution result of the post-processing; and
   executing, by the client, processing based on the execution result of the post-processing.

4. The method according to claim 2 further comprising the steps of:
   if a cancel instruction to cancel the server function call is received, pre-registering by the client a condition used to determine whether to cancel the server function call based on the cancel instruction;
   if the cancel instruction is received, determining by the client whether to cancel the server function call based on the cancel instruction; and
   if it is determined to cancel the server function call, canceling by the client the server function call.

5. A server for executing a server function to be called by a client, comprising:
   a pre-processing registration section for registering pre-processing which is a part of processing corresponding to the server function and which is processing up to the point where the minimum information necessary for the client is obtained;
   a post-processing registration section for registering post-processing which is a part of the processing corresponding to the server function and which is processing to be executed after the pre-processing; and
   a server function correspondence section for establishing correspondence between the registered pre-processing and the registered post-processing with a server function identifier indicating the server function.

6. The server according to claim 5 further comprising:
   a receiving section for receiving from the client a request message which includes a server function identifier indicating a server function called by the client;
   a pre-processing execution section for executing pre-processing corresponding to the server function identifier included in the request message and outputting an execution result of the pre-processing;
   a sending section for sending to the client a completion message which includes the execution result of the pre-processing having been outputted by the pre-processing execution section; and
   a post-processing execution section for executing, after the sending section has sent the completion message, post-processing corresponding to the server function identifier included in the request message.

7. The server according to claim 6, wherein
   the post-processing execution section outputs an execution result of the post-processing, and
   the sending section sends to the client a post-processing result message which includes the execution result of the post-processing having been outputted by the post-processing execution section.

8. A client for making a desired server function call to a server, comprising:
- a sending section for sending a request message to the server to call a desired server function, the request message including a server function identifier which indicates the desired server function;
- a receiving section for receiving from the server a completion message which includes an execution result of pre-processing corresponding to the server function identifier included in the request message, the pre-processing being performed by the server; and
- a control section for executing processing based on the execution result of the pre-processing having been received by the receiving section,
- wherein the server function identifier has a correspondence with the pre-processing and post-processing, the pre-processing being a part of processing corresponding to the server function and being processing up to the point where the minimum information necessary for the client is obtained, and the post-processing being a part of the processing corresponding to the server function and being processing to be executed after the pre-processing.

9. The client according to claim 8, wherein
- the server sends to the client a post-processing result message which includes an execution result of the post-processing,
- the receiving section receives the post-processing result message having been sent from the server, and
- the control section executes processing based on the execution result of the post-processing included in the post-processing result message.

10. The client according to claim 9 further comprising:
- a cancel condition registration section for pre-registering, if a cancel instruction to cancel the server function call is received, a condition used to determine whether to cancel the server function call based on the cancel instruction, wherein
- if the cancel instruction is received, the control section determines whether to cancel the server function call based on the condition registered in the cancel condition registration section, and if it is determined to cancel the server function call, the control section cancels the server function call.

* * * * *